Jan. 8, 1935.　　W. F. MacGREGOR　　1,986,835
DIVISION BLOCK FOR BALERS
Filed March 23, 1933
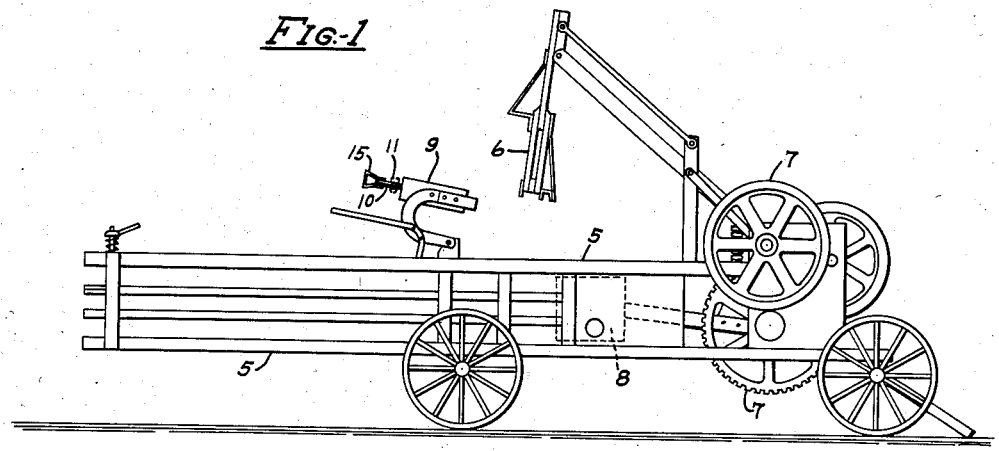
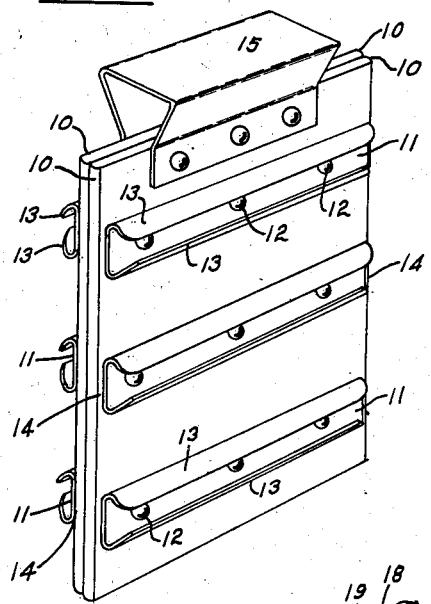
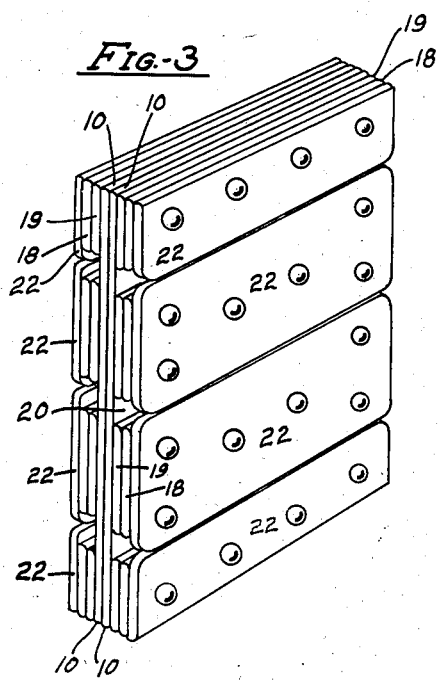
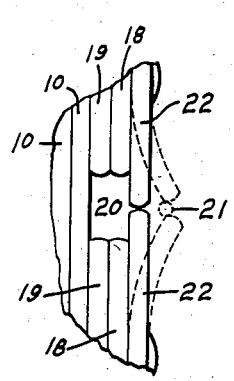
INVENTOR.
WALLACE F. MacGREGOR,
BY James A. Walsh,
ATTORNEY Patented Jan. 8, 1935

1,986,835

UNITED STATES PATENT OFFICE 1,986,835

DIVISION BLOCK FOR BALERS

Wallace F. MacGregor, Racine, Wis., assignor to
J. I. Case Company, Racine, Wis., a corporation Application March 23, 1933, Serial No. 662,289

2 Claims. (Cl. 100—24)

In the operation of hay balers it is the practice to employ heavy built-up wooden blocks to be positioned in the baler chamber when a bale has been completed, to divide it from the bale being formed, which is accomplished by placing the block in a dropper adapted to be tilted to slide or drop the block as the feeder-head is ascending so that the block will be inserted vertically prior to the next descent of the feeder-head to be thereby driven into proper position. It frequently occurs, when a mass of material is advanced by the usual plunger into the path of the descending block and forms such obstruction thereto as to prevent the block from being seated to divide the completed bale from the immediately following bale under formation, that a portion of the block projects above the baling chamber, with the result that when it receives the impact of the feeder-head the resistance of the block due to the obstruction beneath will prevent it from being properly seated so that when the plunger compresses the next charge of material the block will become shattered or driven askew into its seat, requiring cessation of the machinery to remove the block, which is often so distorted or shattered as to be unfit for further use and therefore becomes a material loss. It is my object, therefore, to provide an improved block of elastic material yieldable under pressure in any direction and capable of returning to normal form after being distorted by compression, preferably composed of vulcanized fabric and rubber such as new or old scrap rubber belting and the like, so assembled as to include guides for the usual tie wires, or it may be molded in a single or several parts of such or similar material as desired.

In the accompanying drawing, forming part hereof, Figure 1 is a side elevation of a hay baler including a dropper adapted to insert a division block in the baling chamber to be driven thereinto by impact of a feeder-head, as is common; Fig. 2, a perspective of my improved block; Fig. 3, a perspective of a modified form of block, and Fig. 4 is a fragmentary elevation of the latter.

In said drawing the numeral 5 indicates a baler of any suitable construction, 6 the feeder-head, 7 mechanism for actuating the feeder-head and plunger, 8 the plunger, and 9 the block dropper, all of which parts may be of any desired construction.

The preferred form of block which I employ comprises strips of rubber belting, or the like, as 10, having at opposite sides thereof aligned guides 11, the latter and the strips being secured by rivets 12 or other suitable fastening means, so that when thus assembled, as indicated in Fig. 2, a two-ply block is produced. The guides 11 may be composed of metal or other material having overhanging flanges 13 to form channels through which the usual tie wires are run, and which guides are shorter in length than the width of the strips 10 so that sufficient margins, at 14, of the block material will be provided without obstruction to be readily received in the usual guideways formed at each side of the block dropper. While said guides 11 are shown as applied to the surface of the block it will be understood that they may be embedded in or otherwise associated with the block material. At the upper side of the block a combination impact receiver and handle 15 is provided, which is riveted or otherwise secured to the block to enable ready handling of the latter when inserting the same in the dropper and otherwise, and which, as will be understood, may be composed of material suitable to withstand the impact of the feeder-head when a block is driven into position in the baling chamber.

In Figs. 3 and 4 showing a modified construction, I may employ two or more strips of the elastic material 10, and secure thereto transverse members 18, 19, spaced, at 20, to form channels or guides for tie wires 21, and at the outer side of said members provide transverse strips 22 the edges of which normally serve as flexible coverings for said guides so that as the block pulls away from the wires said cover portions will flex, as indicated in Fig. 4, to permit ready withdrawal of the wires therefrom.

In the manner described I produce a division block of extreme durability, yieldable under pressure in any direction, not subject to destruction under the conditions stated, and which, as indicated, is economical in construction from either salvaged or new rubber belting or molded elastic material.

I claim as my invention:

1. A division block for balers composed of an element yieldable to pressure in any direction and returnable to normal form when compression is removed therefrom having means associated therewith for guiding a tie-wire.

2. A division block for balers composed of material yieldable to pressure in any direction and returnable to normal form when compression is removed therefrom, and a tie-wire guide on the block shorter in length than the width of said block to provide a margin at the outer edges of the block for passing unobstructedly through guideways in a block dropper.

WALLACE F. MacGREGOR.